(12) United States Patent
Hatzikakidis

(10) Patent No.: US 8,083,245 B2
(45) Date of Patent: Dec. 27, 2011

(54) PARAMETRIC CHASSIS SYSTEM FOR VEHICLES, COMPRISING FOUR SUSPENSION ELEMENTS, INCORPORATING A LATERAL TORSION BAR AND CO-AXIAL DAMPER UNIT, IN A BOX-MODULE, THAT ALLOWS CENTRAL LOCATION OF HEAVY ITEMS, SUCH AS BATTERIES

(76) Inventor: Dimitrios A. Hatzikakidis, Palaio Faliro Attikis (GR)

( * ) Notice: Subject to any disclaimer, the term of this patent is extended or adjusted under 35 U.S.C. 154(b) by 0 days.

(21) Appl. No.: 12/978,571

(22) Filed: Dec. 26, 2010

(65) Prior Publication Data

US 2011/0109052 A1    May 12, 2011

Related U.S. Application Data

(63) Continuation of application No. PCT/GR2009/000038, filed on Jun. 11, 2009.

(30) Foreign Application Priority Data

Jun. 25, 2008 (GR) .................................. 080100424

(51) Int. Cl.
   *B60G 21/05* (2006.01)
   *B60G 17/015* (2006.01)

(52) U.S. Cl. ...... 280/124.128; 280/124.13; 280/124.137

(58) Field of Classification Search ........... 280/124.128, 280/124.13, 124.137, 124.149, 124.166
   See application file for complete search history.

(56) References Cited

U.S. PATENT DOCUMENTS

| | | | |
|---|---|---|---|
| 2,286,609 A | 6/1942 | Ledwinka | |
| 2,409,501 A | 10/1946 | Krotz | |
| 3,096,085 A * | 7/1963 | Owens | 267/284 |
| 3,161,420 A * | 12/1964 | Rix | 280/124.13 |
| 3,262,522 A | 7/1966 | Johnson et al. | |
| 3,392,635 A | 7/1968 | Sperl et al. | |
| 3,504,930 A * | 4/1970 | Kozowyk et al. | 280/6.157 |
| 3,504,932 A * | 4/1970 | Kozowyk et al. | 280/124.13 |
| 4,580,808 A | 4/1986 | Smith-Williams | |
| 4,723,790 A | 2/1988 | Wharton | |
| 6,341,677 B1 | 1/2002 | Oliver et al. | |

(Continued)

FOREIGN PATENT DOCUMENTS

DE    951907    2/1955

(Continued)

*Primary Examiner* — Paul N Dickson
*Assistant Examiner* — Drew Brown
(74) *Attorney, Agent, or Firm* — Mayback & Hoffman, P.A.; Gregory L. Mayback; Katie M. Blakley

(57) ABSTRACT

A chassis system and a suspension module for vehicles having wheel subsystems incorporates a lateral torsion bar and a co-axial enveloping damper unit, featuring active-adaptive suspension characteristics. Pre-fabricated suspension modules are situated inside respective box-structures, connected via wheelbase and track members, allowing the storage of heavy elements (e.g., batteries or fuel-cells) at the chassis. The robust and self-carrying chassis is enhanced, using upper body members, in terms of structural rigidity, for a given wheelbase, achieving high impact-energy absorbtion. The suspension arms incorporate upper and lower members, articulation, connect internally or externally to the suspension module, and transmit drive and brake forces to the wheels. The suspension module, box-structure, torsion-bar/damper unit, drive and transmission unit, suspension arm and steer module, featuring asymmetrical steer characteristics, can be reproduced on each corner of the chassis, featuring electronic control without mechanical connection (steer by wire), constituting the chassis of the vehicle.

20 Claims, 17 Drawing Sheets

U.S. PATENT DOCUMENTS

| | | | |
|---|---|---|---|
| 7,111,857 B2 * | 9/2006 | Timoney et al. | 280/124.128 |
| 7,306,247 B2 * | 12/2007 | Wu | 280/124.128 |
| 2004/0069556 A1 | 4/2004 | Chernoff | |

FOREIGN PATENT DOCUMENTS

| | | |
|---|---|---|
| DE | 3535589 | 9/1987 |
| EP | 1134100 | 2/2001 |
| GB | 734267 | 7/1903 |
| JP | 56090712 | 7/1981 |
| WO | 2009/017533 | 2/2009 |

* cited by examiner

PARAMETRIC CHASSIS SYSTEM FOR VEHICLES, COMPRISING FOUR SUSPENSION ELEMENTS, INCORPORATING A LATERAL TORSION BAR AND CO-AXIAL DAMPER UNIT, IN A BOX-MODULE, THAT ALLOWS CENTRAL LOCATION OF HEAVY ITEMS, SUCH AS BATTERIES

CROSS-REFERENCE TO RELATED APPLICATIONS

This is a continuing application, under 35 U.S.C. §120, of copending international application No. PCT/GR2009/000038 filed Jun. 11, 2009, which designated the United States and was not published in English; this application also claims the priority, under 35 U.S.C. §119, of Greece patent application No. GR 20080100424 filed Jun. 25, 2008; the prior applications are herewith incorporated by reference in their entirety.

STATEMENT REGARDING FEDERALLY SPONSORED RESEARCH OR DEVELOPMENT

Not Applicable

BACKGROUND OF THE INVENTION

Field of the Invention

The present invention lies in the field of suspension systems. The present disclosure relates to a parametric chassis system for vehicles comprising four suspension elements, incorporating a lateral torsion bar and co-axial damper unit, in a box-module, that allows central location of heavy items, such as batteries.

SUMMARY OF THE INVENTION

The invention provides a parametric chassis system for road vehicles, comprising four suspension elements, incorporating a lateral torsion bar and an enveloping co-axial damper unit, situated inside a box-structure, that allows that storage of heavy items, such as batteries or fuel cells, within the chassis. The suspension element uses a longitudinal arm, which transmits drive and brake forces to the wheel. The suspension module, which incorporates a lateral torsion bar and a co-axial damper unit, acts as a structural member of the chassis, having active-adaptive and asymmetrical-steer features.

Up until now, such a suspension and chassis configuration has not been devised. In recent years there has been a tendency to increase the wheelbase, due to cabin-space and handling (understeering) considerations. The increase of the wheelbase results in a heavier vehicle, which is further induced by the need to incorporate heavy items such batteries or fuel cells.

This gave rise to the present innovation, which utilizes a multiplicity of identical subsystems, providing high structural rigidity, for a given wheelbase, and a low-cost, compact, light construction. Furthermore, the bay accommodating the heavy items is inherently designed-in the chassis and not fitted as an afterthought. The well-known suspension of leading and trailing arms is coupled to a new concept of springing, using a lateral torsion bar and an enveloping co-axial damper unit, which can be activated in an active-adaptive manner. The resulting chassis can be produced in a cost-effective way, utilizing the concept of component multiplicity, positioning four identical suspension modules on each corner of the chassis. Furthermore, the chassis uses the modules as structural members, achieving high structural rigidity, for a given wheelbase, as the frame is made shorter by a length of two suspension arms (by comparison to adopting conventional McPherson linkages or transverse arms) while improving wheel compliance.

A chassis system, and suspension module for vehicles comprising a subsystem for each wheel, incorporating a lateral torsion bar 1 and co-axial enveloping damper unit 9, featuring active-adaptive suspension characteristics. Four pre-fabricated suspension modules are situated inside respective box-structures, connected via wheelbase and track members, allowing the storage of heavy elements (such as batteries or fuel-cells) make up the chassis.

The chassis being robust and self-carrying is enhanced, using upper body members, in terms of structural rigidity, for a given wheelbase, achieving high impact-energy absorbtion. The suspension arms 5 can incorporate upper and lower members, articulation, connect internally or externally to the suspension module, and transmit drive and brake forces to the wheels.

The suspension module, the box-structure, the torsion-bar/damper unit, drive and transmission unit, suspension arm and steer module, featuring asymmetrical steer characteristics, can be reproduced on each corner of the chassis, featuring electronic control without mechanical connection (steer by wire), constituting the chassis of the vehicle.

With the foregoing and other objects in view, there is provided, in accordance with the invention, a suspension-box-module for use with a longitudinal suspension arm having a steering assembly and locating and accommodating a wheel, a transmission wheel, the steering assembly, and a universal joint for the wheel, the suspension-box-module comprising a suspension-box housing, a lateral torsion bar being a structural member of the suspension-box housing and having a connection base having an end, an inner anchoring end having a shank, an external end operable to connect to the longitudinal suspension arm through the connection base, and a central part having a form and a cross-section varied as a function of its length, a co-axial damper unit housing a damper-fluid and having seals sealing the damper-fluid, connectors, and wings having a base, the base and the connectors being connected to the torsion bar through the seals, an anchoring fixing the co-axial damper unit to the suspension-box-module, a co-axial transmission ring operable to connect to the longitudinal suspension arm and having a steering assembly, bearings for transmitting loads, a bracket shaped to support the suspension arm, a fastener operable to connect the suspension arm to the torsion bar at the end of the connection base, a connection connecting the torsion bar to the shank at the inner anchoring end, a belt, and a support bearing connecting the torsion bar to the co-axial transmission ring, the co-axial transmission ring operable to transmit power and braking to the wheel through the belt.

With the objects of the invention in view, there is also provided a parametric chassis system for vehicles having a rear suspension, the system comprising a rear subframe for the rear suspension, the rear subframe having a track, a pair of trailing arms, and two pre-fabricated suspension-box-modules connected to the pair of trailing arms, the rear subframe being formed by a pair of two opposed box-panels encasing the two pre-fabricated suspension-box-modules, each suspension-box-module comprising a co-axial damper unit, a base, and a lateral torsion bar, each suspension-box-module enveloping the respective co-axial damper unit and locating a respective one of the two trailing arms through a respective base, a track panel forming a spacer connecting the two opposed suspension-box-modules, the track of the rear subframe being defined by a size of the track panel, a front subframe having two swivels, two pre-fabricated suspension-box-modules, and two leading arms, the front subframe corresponding to a reversed rear subframe and locating the two leading arms and wheels, the front subframe operable to carry out steering of the wheels through the two swivels, two longitudinal panels defining a wheel base of the vehicle and connecting the rear subframe to the front subframe, a chassis having four corners, the four suspension-box-modules of the front subframe and the rear subframe being located on a respective one of the four corners of the chassis, the chassis in a fully active/adaptive mode being operable to apply asymmetric steering characteristics, being controlled electronically without mechanical connection, and providing vehicle control of ride-height, body-roll and dynamic handling by ensuring verticality of the wheels to a given degree.

With the objects of the invention in view, there is also provided a body-shell of a vehicle, comprising the parametric chassis system according to the above and external body-shell members, the body-shell formed by the chassis system and the body-shell members being supplementary self-carrying.

In accordance with another feature of the invention, the wings of the co-axial damper unit are connected to the base and the connectors of the co-axial damper unit.

In accordance with a further feature of the invention, the torsion bar is operable to be secured to the suspension arm.

In accordance with an added feature of the invention, there is provided a sliding mechanism operable to change a torsional stiffness of the torsion bar by sliding of an anchoring point of the torsion bar.

In accordance with an additional feature of the invention, there is provided external support bearings for supporting the suspension arm, the external support bearings having a contoured design.

In accordance with yet another feature of the invention, the suspension-box housing is encased by box-panels of a parametric chassis and is located through support guides and securing sections at the box-panels.

In accordance with yet a further feature of the invention, a parametric chassis having box-panels encasing the suspension-box housing and support guides and securing sections locating the suspension-box housing at the box-panels.

In accordance with yet an added feature of the invention, each of the suspension-box-modules is a suspension-box-module according to the above.

In accordance with yet an additional feature of the invention, the chassis defines a storage bay and a slot, and further comprising panels at the storage bay, the storage bay and the panels shaped to store at least one of a battery and a fuel cell of the vehicle, the storage bay being accessible externally through the slot.

In accordance with again another feature of the invention, each of the suspension-box-modules is anchored on one of the box-panels of the rear and front subframes at an inner anchoring point and a bulge on the torsion bar of each suspension-box-module secures a position of the torsion bar relative to the corresponding one of the rear and front subframes.

In accordance with again a further feature of the invention, the trailing arms and the torsion bars of the suspension-box-modules of the rear subframe are located on the rear subframe with brackets and the leading arms and the torsion bars of the suspension-box-modules of the front subframe are located on the front subframe with brackets.

In accordance with again an added feature of the invention, the trailing and leading arms of the rear subframe and the front subframe are seated on bearings externally of the respective one of the suspension-box-modules.

In accordance with again an additional feature of the invention, each suspension-box-module is supported with support surfaces in one of the box-panels and is secured on the respective box-panel though a securing section.

In accordance with a concomitant feature of the invention, wherein the external body-shell members are formed by a tailoring technique using a design criterion for high impact-energy-absorption for the body-shell without the need of other design criteria having originated from the design of the chassis.

Although the invention is illustrated and described herein as embodied in a parametric chassis system for vehicles comprising four suspension elements, incorporating a lateral torsion bar and co-axial damper unit, in a box-module, that allows central location of heavy items, such as batteries, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Additional advantages and other features characteristic of the present invention will be set forth in the detailed description that follows and may be apparent from the detailed description or may be learned by practice of exemplary embodiments of the invention. Still other advantages of the invention may be realized by any of the instrumentalities, methods, or combinations particularly pointed out in the claims.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward.

BRIEF DESCRIPTION OF THE DRAWINGS

The invention will be made conceivable with reference to the designs that accompany the present description, in which certain proposed industrial applications of the invention are displayed indicatively.

The accompanying figures, where like reference numerals refer to identical or functionally similar elements throughout the separate views, which are not true to scale, and which, together with the detailed description below, are incorporated in and form part of the specification, serve to illustrate further various embodiments and to explain various principles and advantages all in accordance with the present invention. Advantages of embodiments of the present invention will be apparent from the following detailed description of the exemplary embodiments thereof, which description should be considered in conjunction with the accompanying drawings in which.

DETAILED DESCRIPTION OF THE INVENTION

Figure 1:
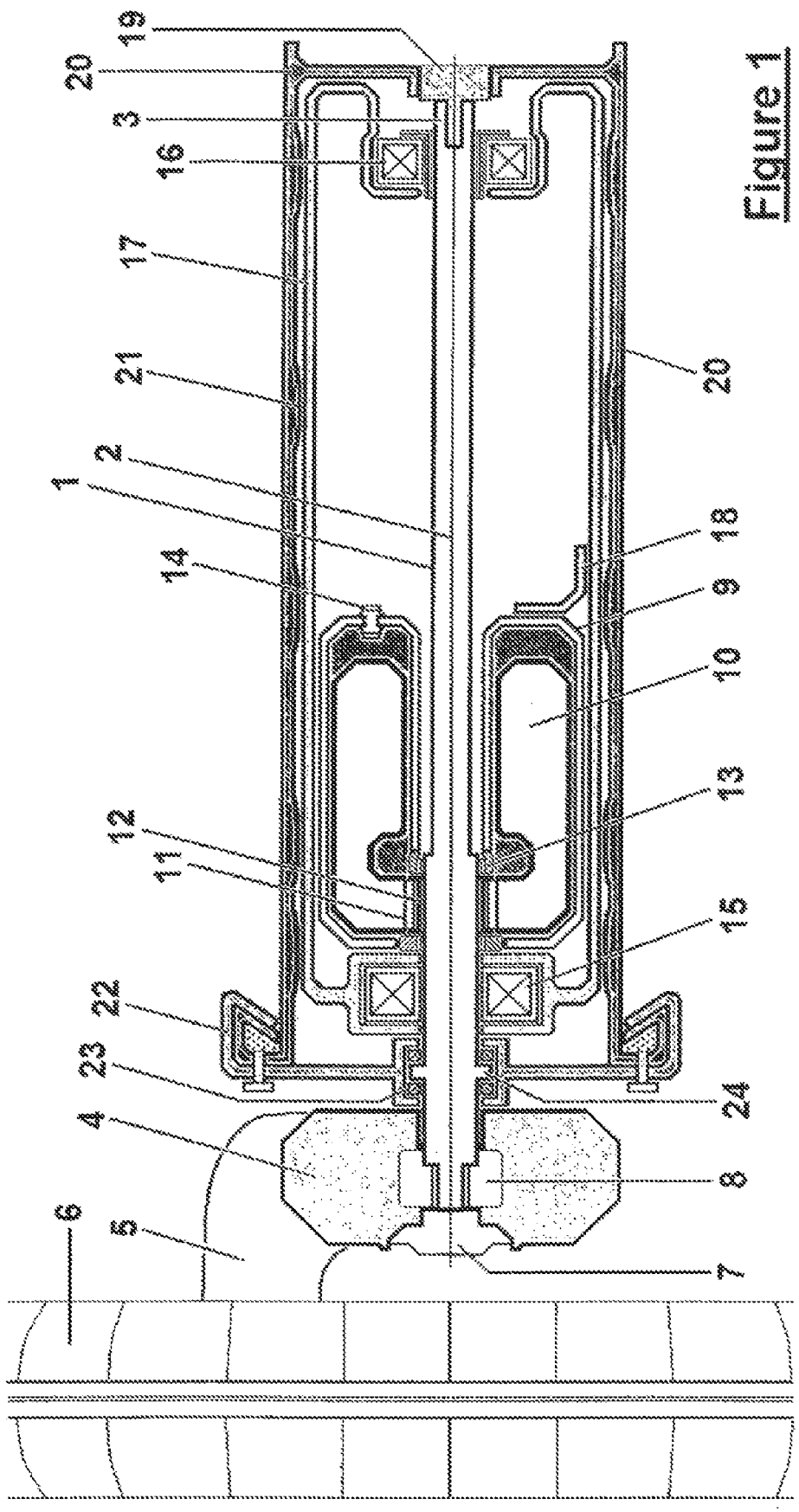
FIG. 1 is a fragmentary, cross-sectional view of the suspension module according to the invention with a location of a lateral torsion bar and an enveloping co-axial damper unit on the frame, the suspension arm and wheel.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward.

Alternate embodiments may be devised without departing from the spirit or the scope of the invention. Additionally, well-known elements of exemplary embodiments of the invention will not be described in detail or will be omitted so as not to obscure the relevant details of the invention.

Before the present invention is disclosed and described, it is to be understood that the terminology used herein is for the purpose of describing particular embodiments only and is not intended to be limiting. The terms "a" or "an", as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically.

Relational terms such as first and second, top and bottom, and the like may be used solely to distinguish one entity or action from another entity or action without necessarily requiring or implying any actual such relationship or order between such entities or actions. The terms "comprises," "comprising," or any other variation thereof are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure.

Herein various embodiments of the present invention are described. In many of the different embodiments, features are similar. Therefore, to avoid redundancy, repetitive description of these similar features may not be made in some circumstances. It shall be understood, however, that description of a first-appearing feature applies to the later described similar feature and each respective description, therefore, is to be incorporated therein without such repetition.

Referring to a selected indicative example of industrial application of the invention, a number of the main sections and components of the system are listed below. More specifically, the basic parts of the invention are the following:
1. Suspension bar.
2. Suspension axis.
3. Anchoring end (Passive end or Active end).
4. End connection base (Suspension connection).
5. Suspension arm.
6. Wheel.
7. Fastener securing the arm to the torsion bar.
8. Connection unit of suspension arm to the torsion bar.
9. Damper (Active or not).
10. Wings of damper.
11. Base of wings (of damper).
12. Connection of the torsion bar to the wings of damper.
13. Damper flanges (seals).
14. Feed and control valves of liquid for the damper.
15. Support bearing (of suspension).
16. Inner bearing (of support of the suspension).
17. Suspension box-module, comprising lateral torsion-bar and enveloping co-axial damper unit.
18. Anchoring of damper to the box-module.
19. Point of anchoring of the torsion bar.
20. Panel of suspension and sleeve of position of the casing of the suspension.
21. Support guides of the suspension module, in the panel of the frame.
22. Securing section for the box-module, on the panel.
23. Securing section of the rod on the chassis.
24. Securing bulge on the bar.
25. External supporting bracket of the arm on the chassis.
26. External fastener for connection of the arm to the chassis.
27. Active end of anchoring.
28. Shank at the connection end of the reaction mechanism.
29. External support bearings (of the arm).
30. Internal support bearings of the arm.
31. Sliding mechanism of anchoring.
32. Sliding groove in the torsion bar.
33. Ring for transmission of motion (co-axial with bar).
34. Transmission belt.
35. Transmission wheels (or pulleys).
36. Support bearings.
37. Elastic cover of transmission belt.
38. Track element or member (panel).
39. Wheelbase element or member (panel).
40. Upper solid section of the suspension arm.
41. Secondary inner section of the suspension arm.
42. Hinged upper section of the suspension arm.
43. Hinged lower section of the suspension arm.
44. Steered wheel shank (king-pin spindle or swivel, for steering).
45. Supplementary exterior upper member of body shell (front and rear).
46. Storage bay of alternative fuels or batteries.
47. Total frame (chassis) of vehicle.
48. Electric motor (for power transmission and braking).
49. Slot for access in to the storage area.
50. Aerodynamic surface on the arm.
51. Universal joint (Constant velocity joint).
52. Total sub-system (FIG. 16).
53. Vehicle (FIG. 17) consisting of 4 sub-systems.
54. Assembly of power transmission (drive unit).
55. Assembly of the steering input (for the steered wheel).
56. Assembly for the control of pressure of the liquid for the damper.
57. Assembly for the control of the reactive force of the torsion bar (in the active spring mode).

Figure 14:
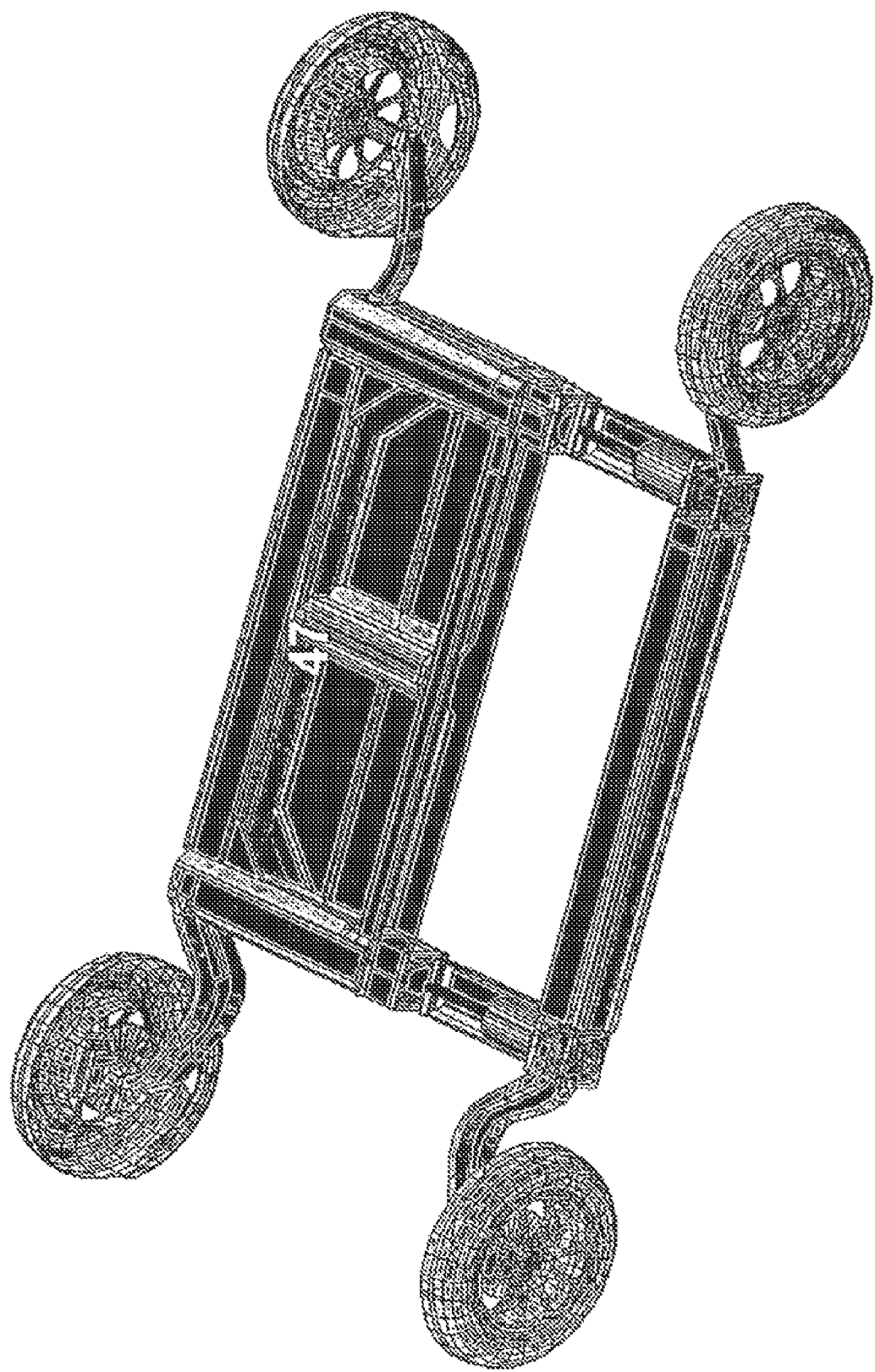
FIG. 14 is a perspective view of the inventive system according to the invention with a section of two exemplary modules.

Described now are exemplary embodiments of the present invention. Referring now to the figures of the drawings in detail and first, particularly to FIG. 14, there is shown a first exemplary embodiment of a frame (or chassis) 47 of a vehicle, that is cheap to manufacture, by using prefabricated sub-systems 17 and parametric components 38, 39. The chassis 47 is simple and robust and can accept active-adaptive technology at the inner anchoring 19 of the torsion bar 1 in the suspension module 17 as shown in FIG. 6.

Figure 9:
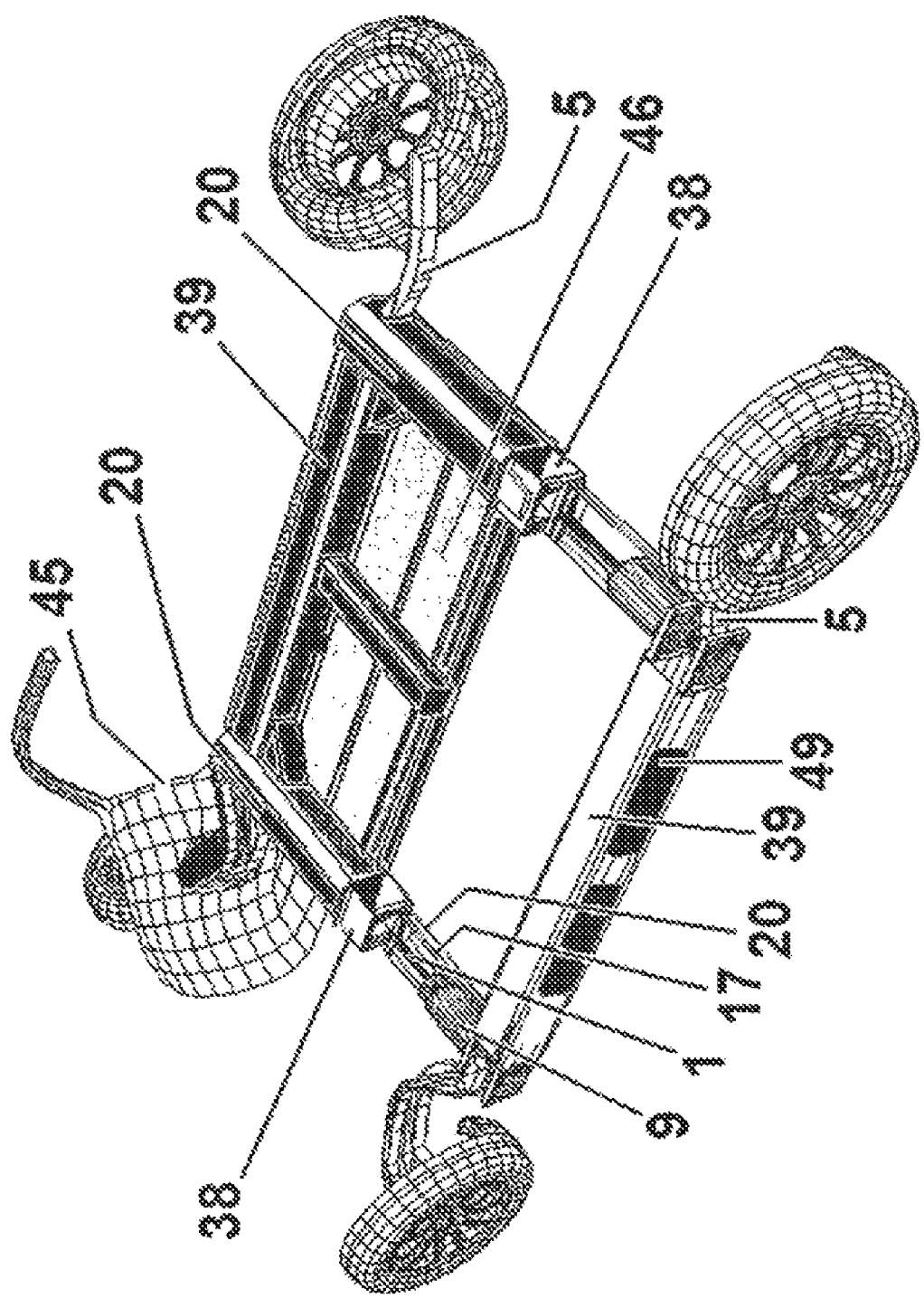
FIG. 9 is a partially cut-away perspective view of an exemplary embodiment of the chassis according to the invention, half of the display showing as it is externally and the other half showing partial elements of the suspension and the front supplementary external upper-section of the body-shell.

According to an exemplary application of the invention, the inventive system of frame, is of a chassis type (as shown in FIG. 9), employing a pair of totally lagging arms 5 for the rear suspension.

A sub-frame is created by two opposed panels 20, connecting the two prefabricated transverse systems 17 of the suspension bar 1 (for springing)/damper 9 in box-modules, that connect the suspension arms 5 via the end connection bases/suspension connection 4 to the bars 1 as shown in FIG. 1.

Figure 6:
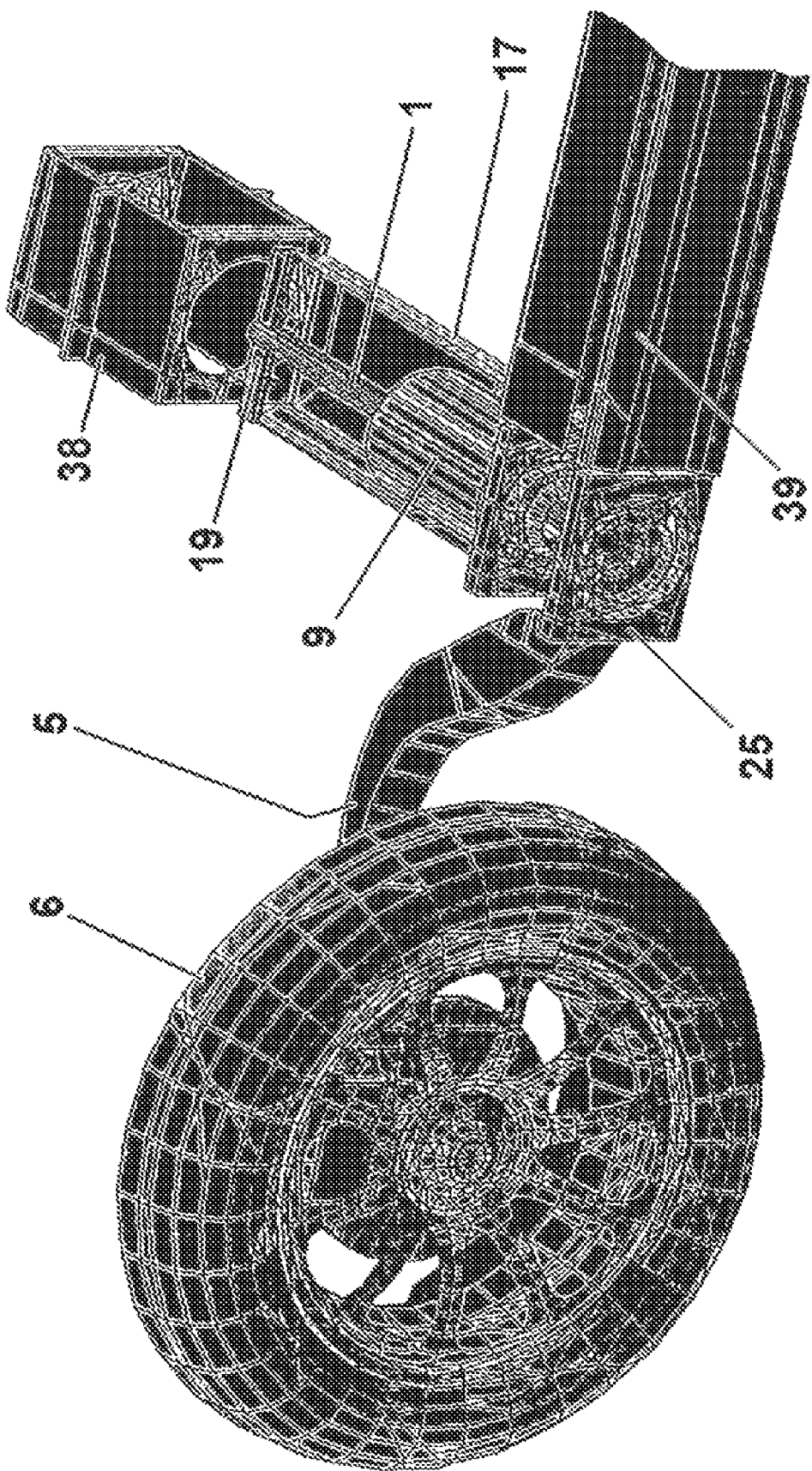
FIG. 6 is a fragmentary, perspective view of a suspension system according to the invention with the arm, the wheel, sections of the suspension module and the track element of the chassis shown and without the panel.

The vehicle's (rear) track is defined by the center section of the track element 38 as shown in FIG. 6.

Figure 11:
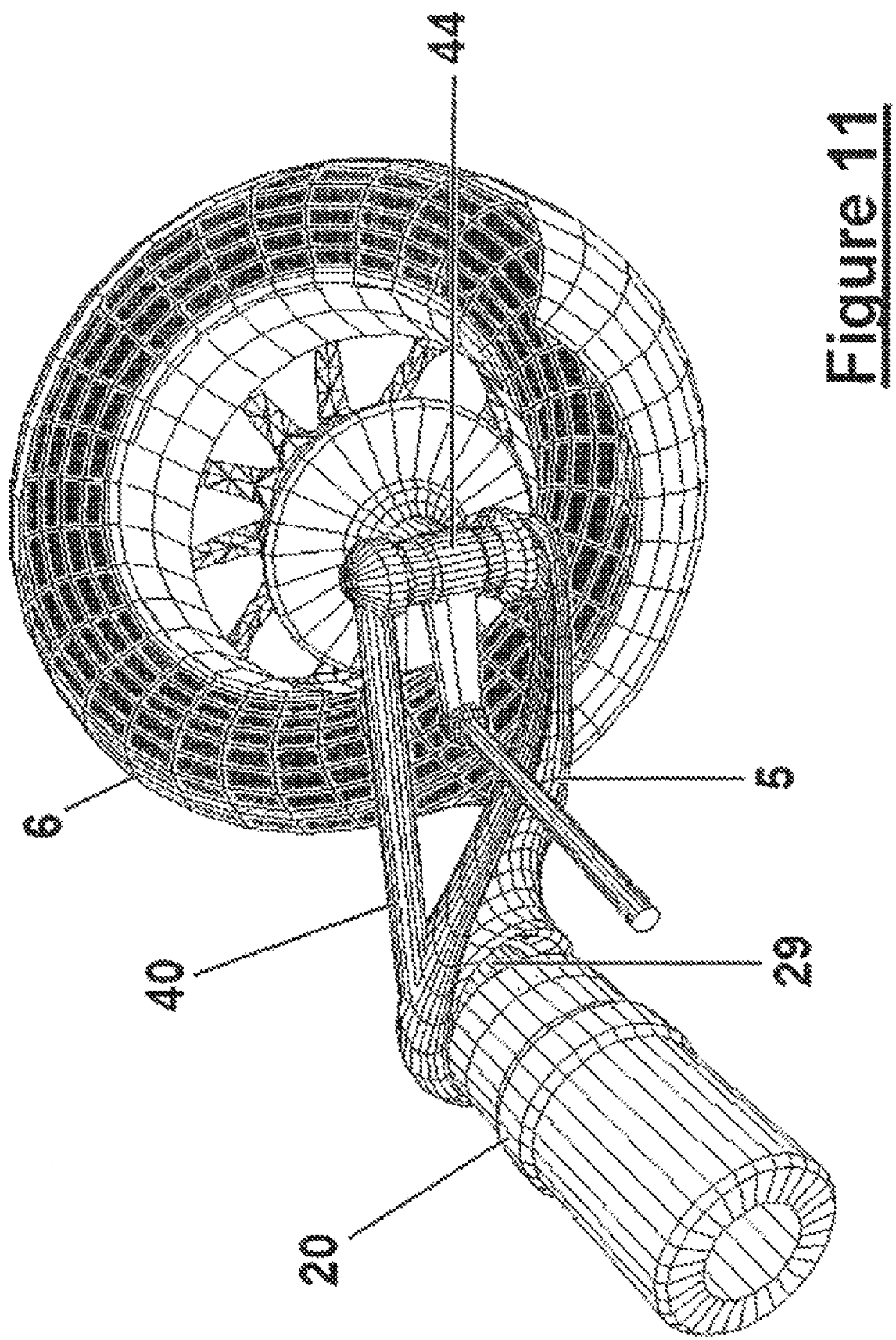
FIG. 11 is a fragmentary, perspective view of an alternative exemplary embodiment of an arm of the suspension and the wheel according to the invention.

The same system reversed, serves as the front suspension, with the difference that the arm 5 on its end, instead of steadily anchoring the bearing of the wheel 6, allows its rotation around an axis through the shank 44 as shown in FIG. 11.

The front and rear suspensions are characterized by successive repetition (duplication), in the case of the sub-frames and for the entire frame. A frame is formed, by the use of sections of the wheelbase 39, in which the active suspensions 27, 28, 31, 57/dampers 9, 14, 56 and the panels of storage of batteries or alternative fuels 46 (see FIG. 9), all participate. This assembly, in fully active/adaptive mode has control of height, control of roll and control of dynamic handling that ensures always the verticality of the wheels to the desired degree.

Figure 4:
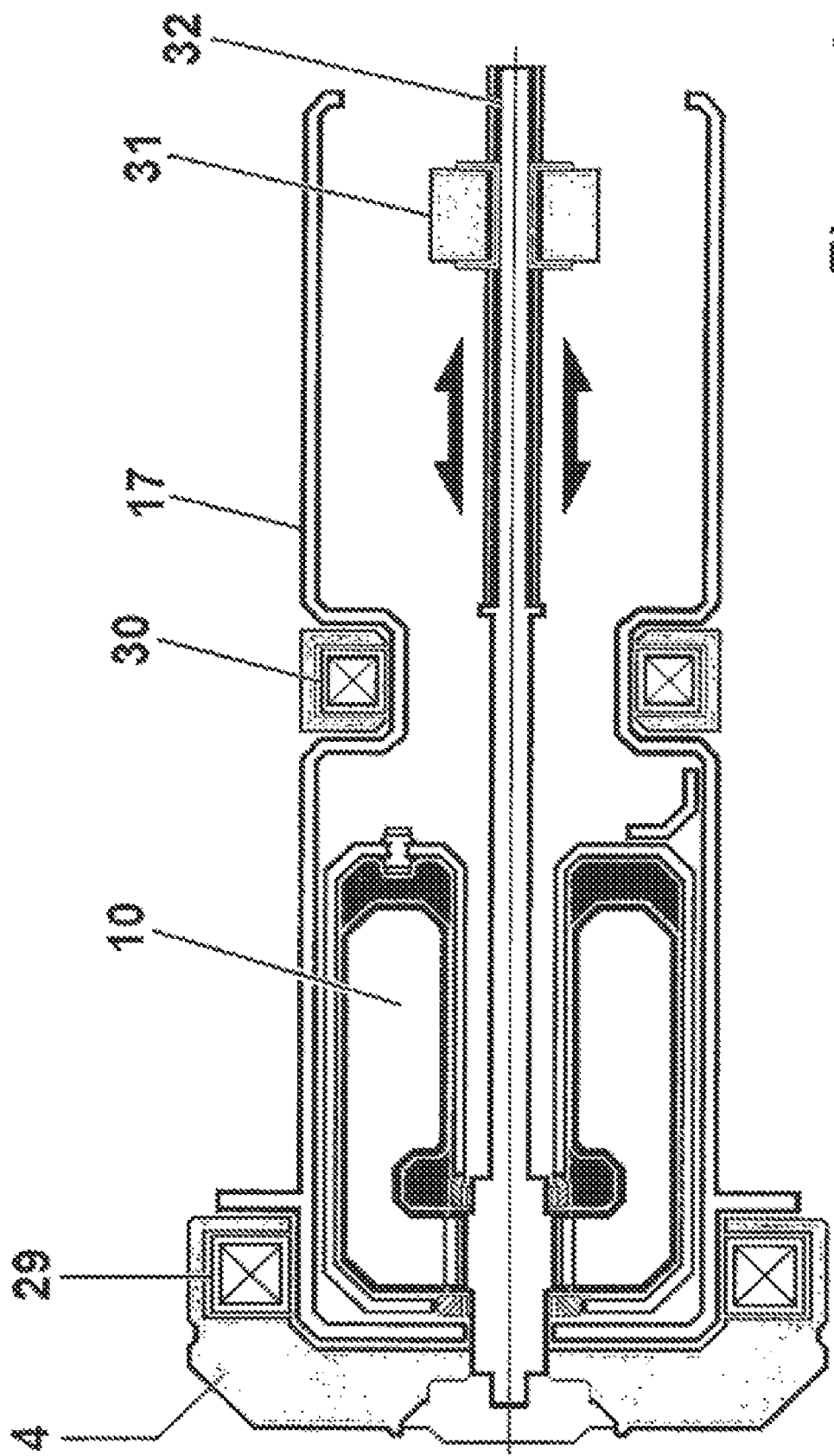
FIG. 4 is a cross-sectional view of an alternative to the variable anchoring (locating of the fixing end) of the torsion bar.
Figure 12:
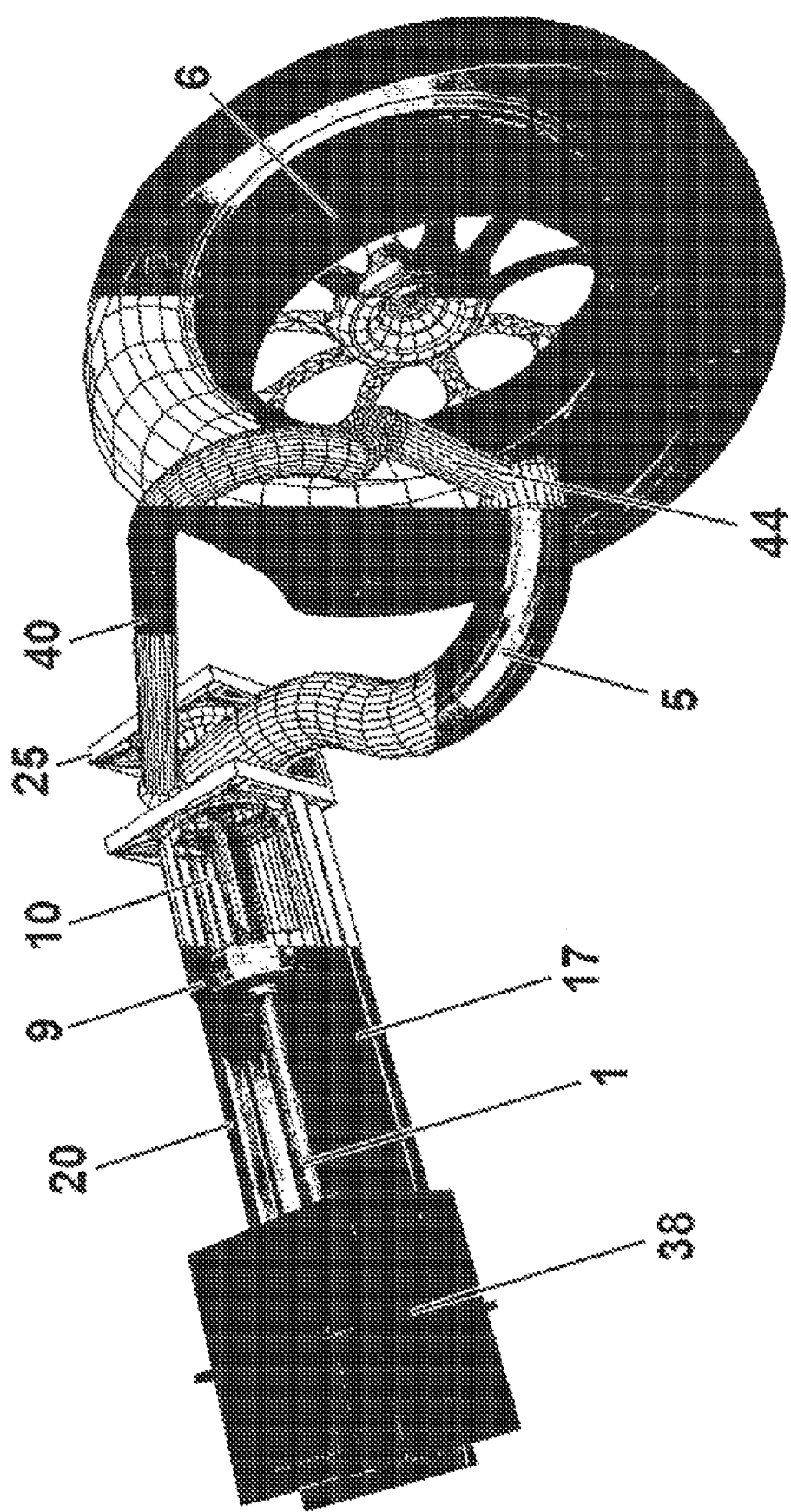
FIG. 12 is a fragmentary, perspective view of an alternative exemplary embodiment of the arm of the suspension, the wheel, the damper in section, the torsion bar and the track element.
Figure 13:
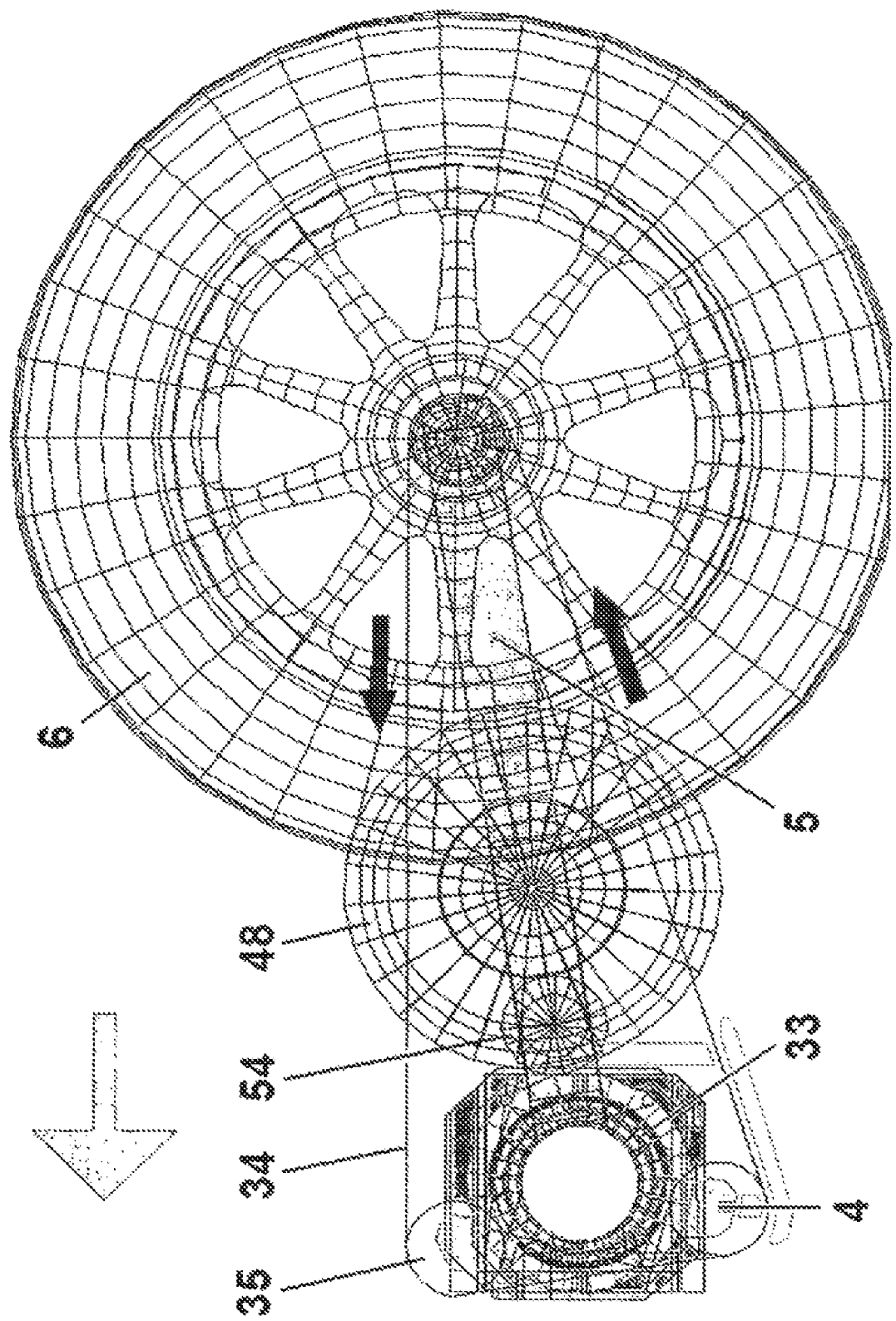
FIG. 13 is a side elevational view of an exemplary embodiment of the transmission system of the arm with a belt according to the invention.

In a passive mode, the inventive system induces the driving characteristics (advantages and disadvantages) of lagging/advancing (trailing/leading) arms (with the necessary interventions for bump-steer, roll-steer etc). This is achieved by the contouring of the profile of the external support bearing 29 of the suspension (see, e.g., FIGS. 4, 5, and 11), in combination with the design of the shank 44 as shown in FIG. 12.

The above describes a simplified version of the invention.

The culminating application of this innovation is the use of four identical subsystems that have active and adaptive suspension, power transmission/braking and steering for the wheel, that is based on a system of a lateral torsion bar 1 (spring) and damper 9, in a box-module 17 embedded in a panel 20, connected to a motor 48, a transmission assembly 54, a transmission ring 33, transmission wheels 35, suspension arm 5, steering system (by one or two electric/hydraulic or equivalent mechanisms 55), control assembly for the pressure of the damper liquid 56 and control assembly for reactive springing of the torsion bar 57, implementing asymmetric steering.

Asymmetric steering is defined as inducing greater steering angles on the outer (front and rear) wheels than the inner wheels.

During the vehicle's turning process, the weight transference increases the loads on the wheels of the outer side of each axle. The outer wheels are steered by greater steering angles, whereas the inner wheels complete dynamically their rotations, steered by smaller angles, in function with the differential in loading between the outer and the inner wheel. In quasi-static dynamic conditions (with very small vehicle speeds), the front and the rear outer wheels turn and are steered, whereas the inner wheels turn and are steered less, changing the rates of their rotation, without violating the principle of creation of an angle of lateral sliding (sideslip) according to Ackermann.

In the inventive system shown, for example, in FIG. 9, a robust total sub-frame is created for the (front and rear) suspension, that allows the creation of a storage area 46 for heavy batteries or fuel cells in the center, that is accessible externally through a slot 49. This allows the manufacture of a total body shell that is supplementary self-carrying, in combination with external sections of the body-shell 45 (front and rear). These can be configured by a tailoring technique, with the main design criterion being the absorption of impact energy, without the need of other design arrangements (see, e.g., FIG. 9).

Figure 10:
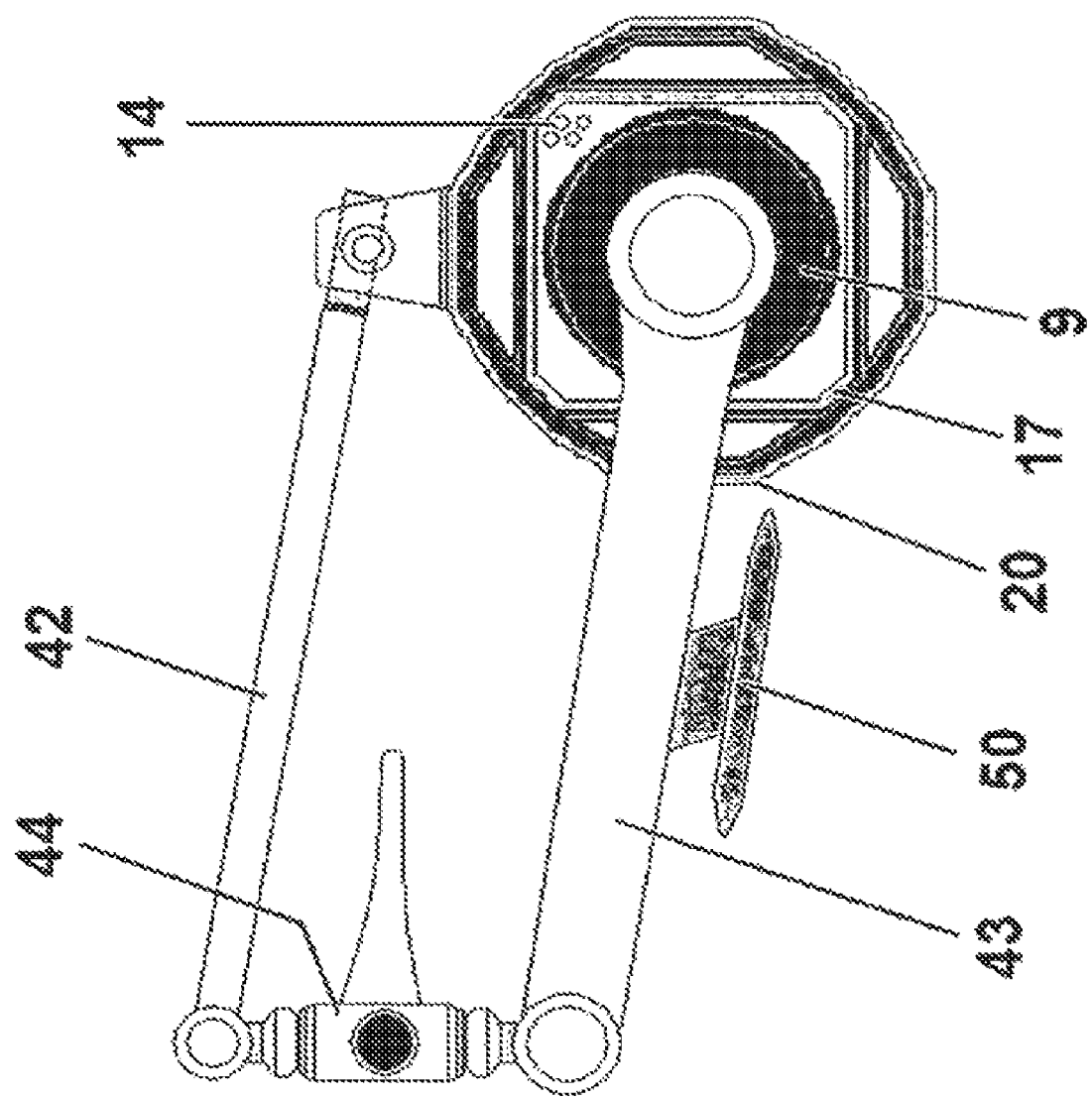
FIG. 10 is a partially hidden and side elevational view of an alternative exemplary embodiment of the front assembly according to the invention with hinged suspension arms.

The suspension box-module 17 in a panel 20 (see, e.g., FIG. 1) encloses the suspension. The torsion bar 1, which constitutes the "spring" of the suspension, is anchored to the panel of the frame 20 in the inner fixed point of anchoring 19. The torsion bar 1 has different cross-sections and form, in relation to its length. The bulge 24 secures its position on the frame 23. On the outer end of the bar 1, the wings 10 of the damper 9 are fixed on the bar, via sections 11, 12. During the travelling of the suspension, the bar 1 is rotated differentially around the axis 2 (as a function of its length), rotating the wings 10. The casing of the damper 9 is anchored 18 on to the casing 17 of the box-module. The damping is achieved through the relative rotary motion of the wings 10, fixed on the outer end of the bar 1 and the smaller fixed wings connected to the casing 9, or through any other assembly. The contained liquid in the damper 9 is sealed by flanges 13 and through valves 14 of supply/control and relevant assemblies 56, the active damping is achieved. Supplementary damping may also be achieved through already known aerodynamic surfaces 50 (see, e.g., FIG. 10). The box-module of the suspension 17 is placed and supported with surfaces 21 and it is secured on the panel of the frame 20, through the securing section for the box-module on the panel 22.

Figure 2:
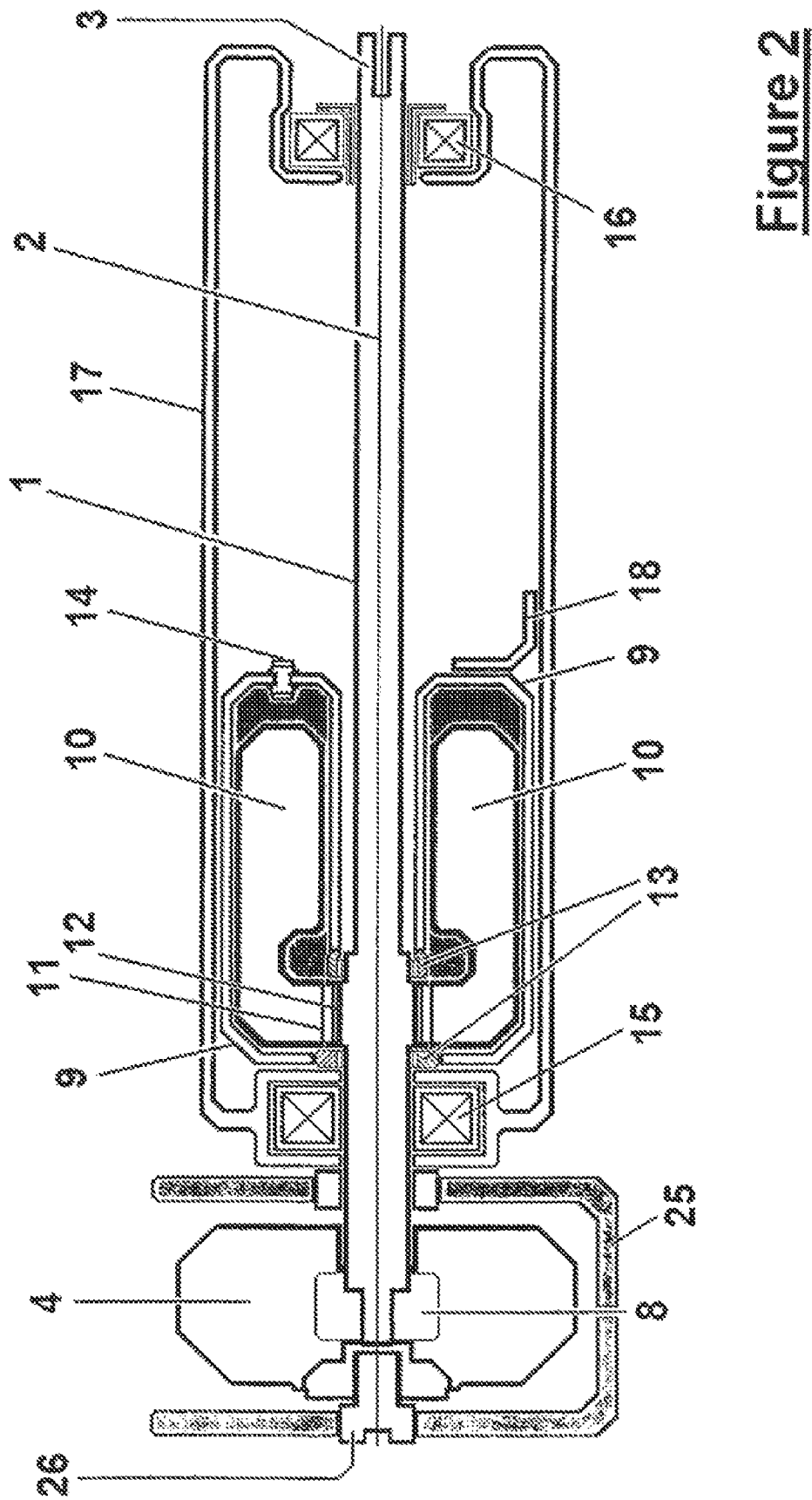
FIG. 2 is a cross-sectional view of an alternative locating system (using a bracket) for the suspension arm according to the invention.
Figure 3:
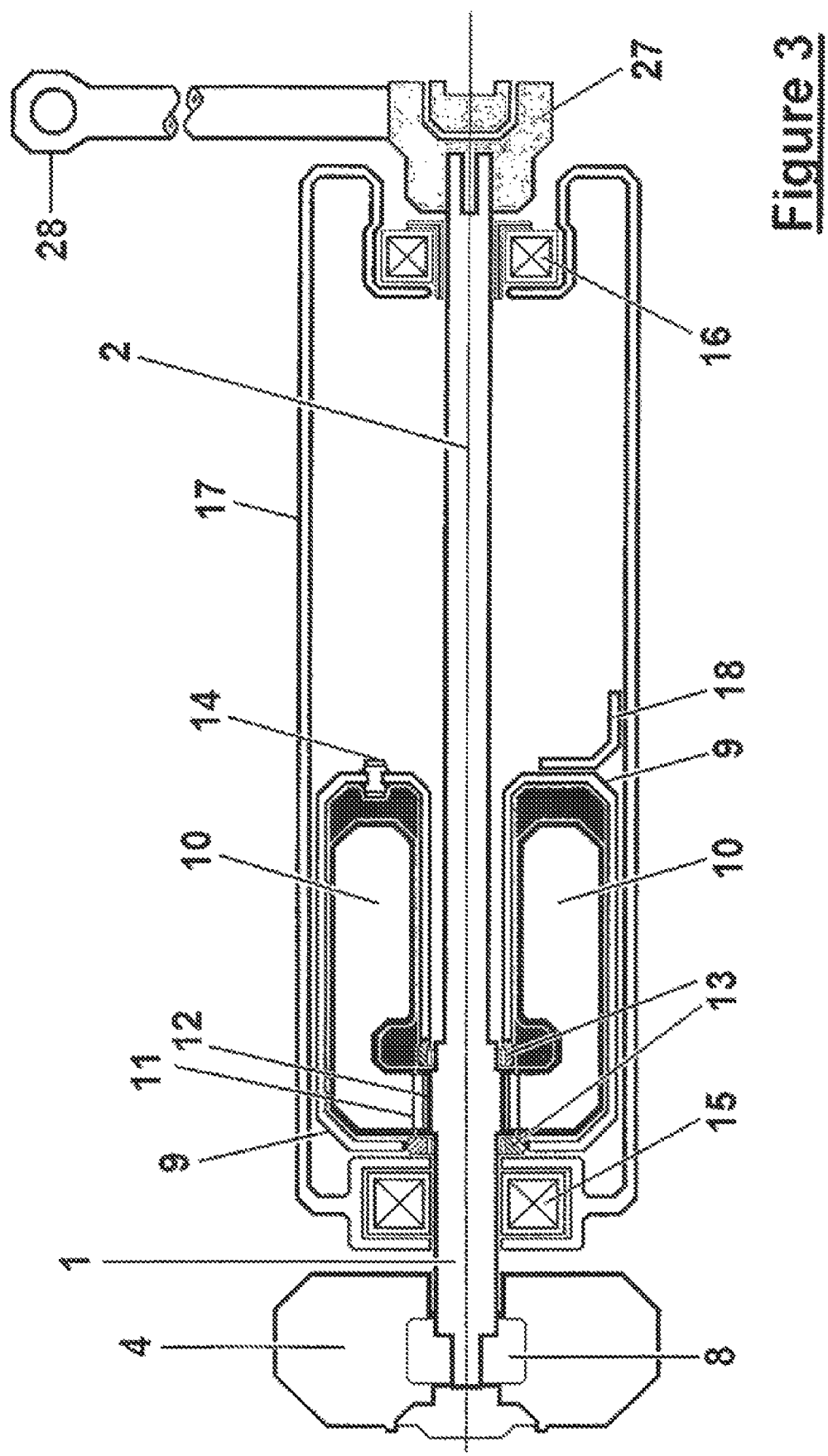
FIG. 3 is a fragmentary, cross-sectional view of a locating assembly for the reactive springing of the active-adaptive control according to the invention.
Figure 7:
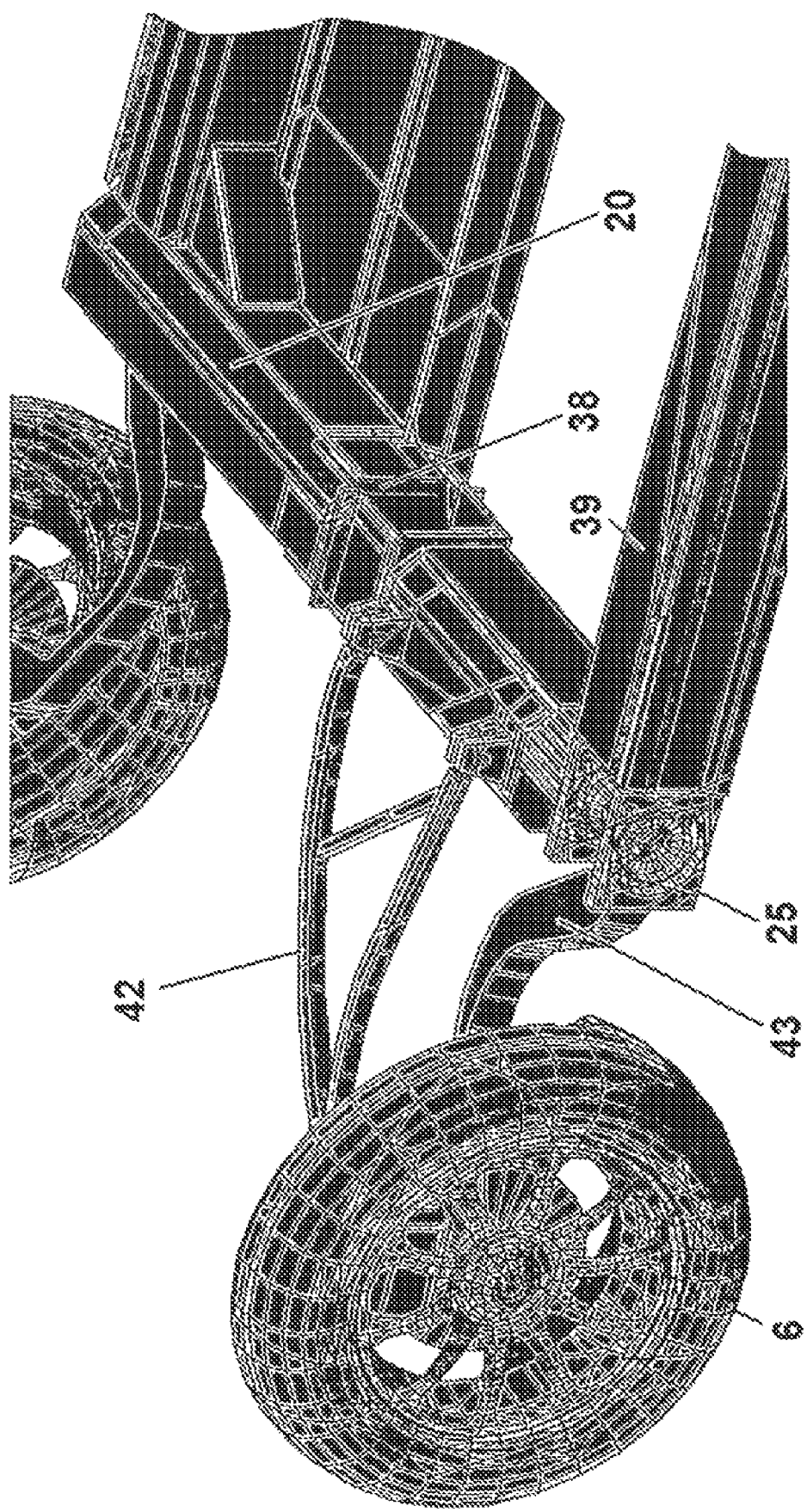
FIG. 7 is a fragmentary, perspective view of an alternative exemplary embodiment of a hinged upper section of the arm of the paneled suspension according to the invention.

The bar 1 is connected and secured to the suspension arm 5 through sections 7 and 8 (see, e.g., FIG. 1). The arm 5 through the bar 1 is alternatively supported via the bracket 25 to the frame and it is secured through the fastener 26 (see, e.g., FIGS. 2, 6, and 7). The suspension arm in active mode reacts on the end 27, through a shank 28 as shown in FIG. 3. Alternatively, the apparent constant (torsional rigidity) of the torsion bar changes through the transfer of the anchoring point, using a sliding mechanism 31, 32 and relevant assemblies shown, for example, in FIG. 4.

Figure 5:
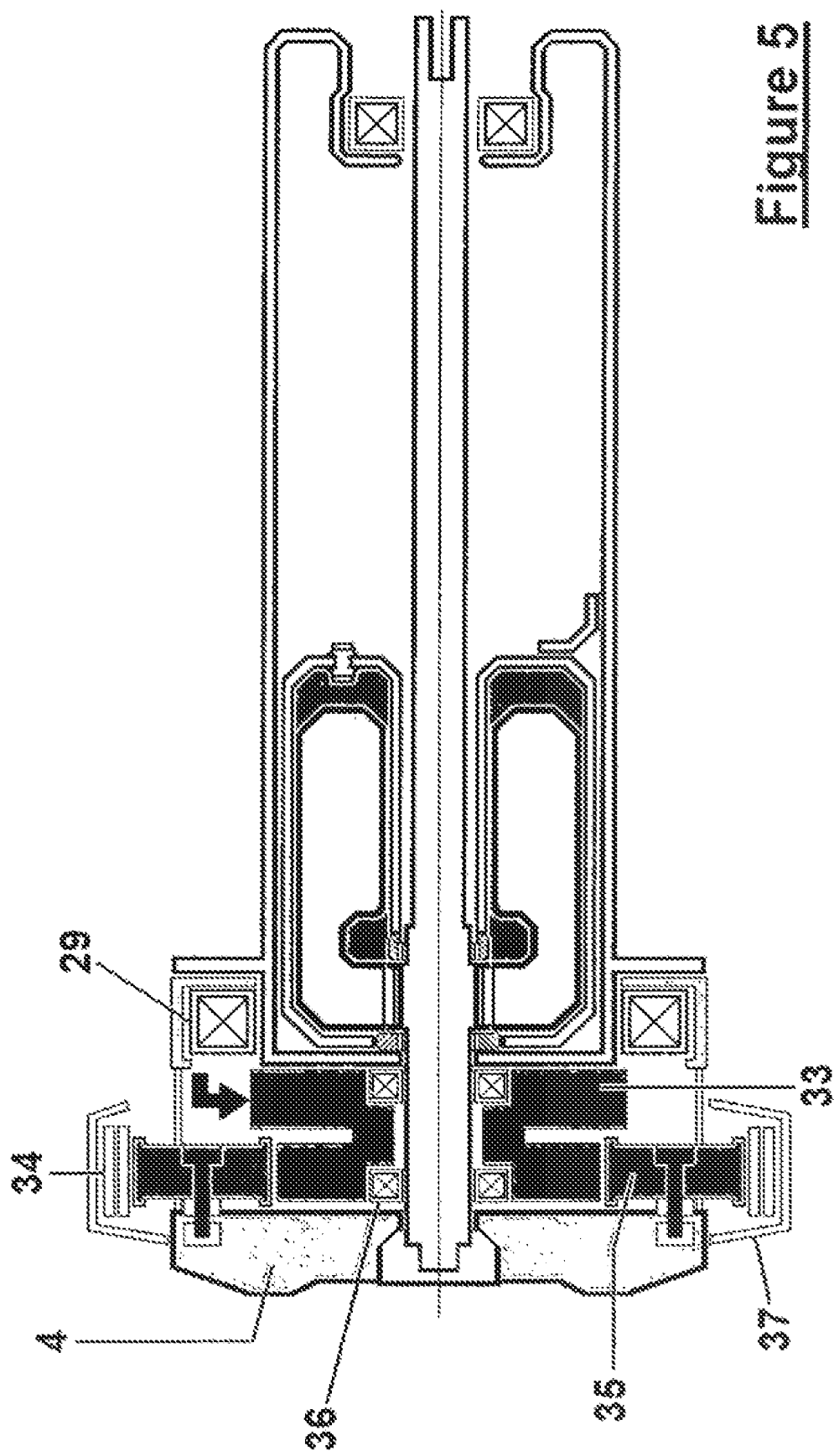
FIG. 5 is a cross-sectional view of the power transmission system, with a belt through the arm, in a configuration according to the invention.
Figure 15:
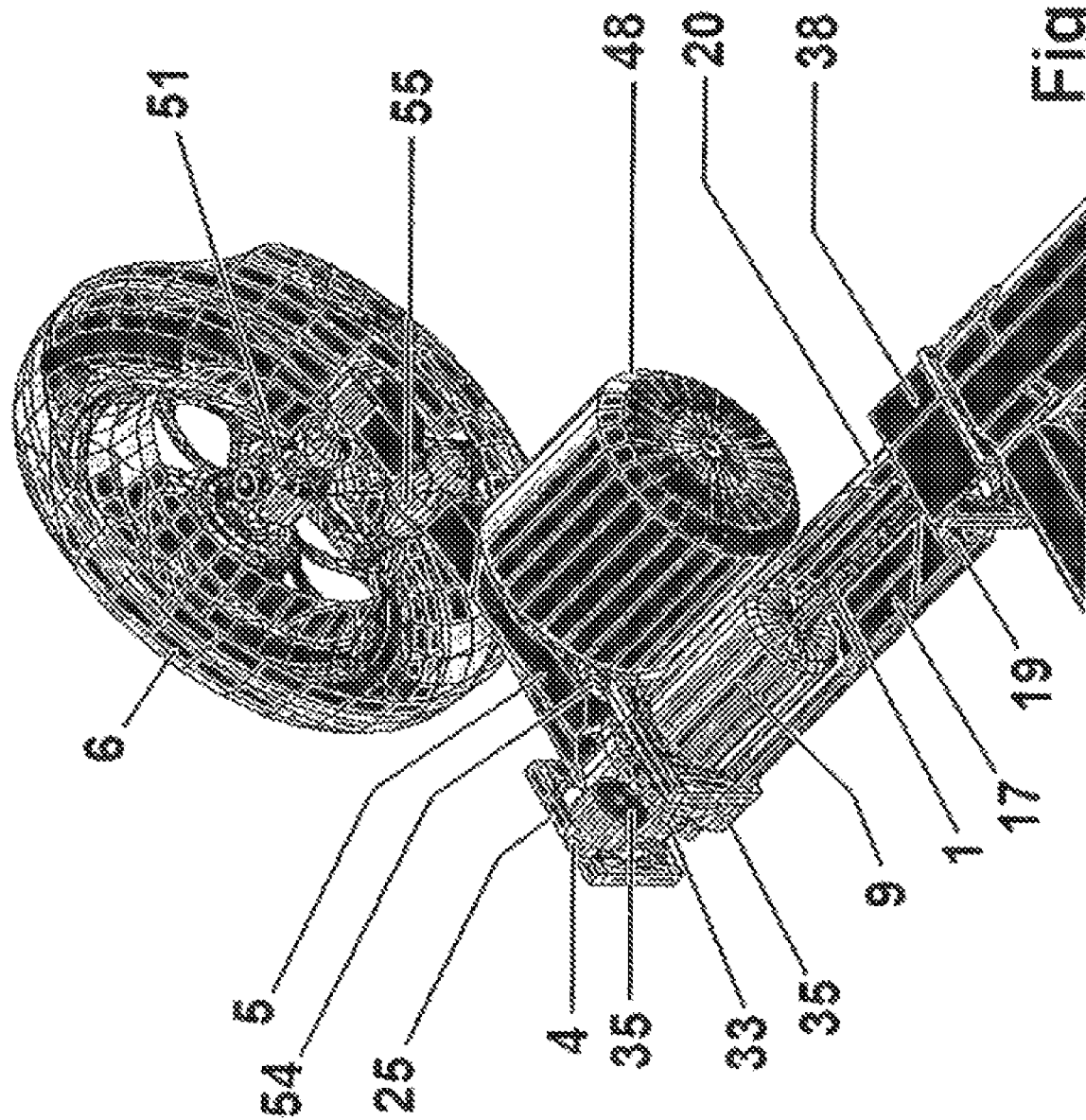
FIG. 15 is a fragmentary perspective view of one quarter of the frame according to an exemplary embodiment of the invention showing the basic parts of the invention including the motor, the transmission system through the arm, the system of asymmetric steering, the module in section, the torsion bar, and the co-axial system of damper and the track element.
Figure 16:
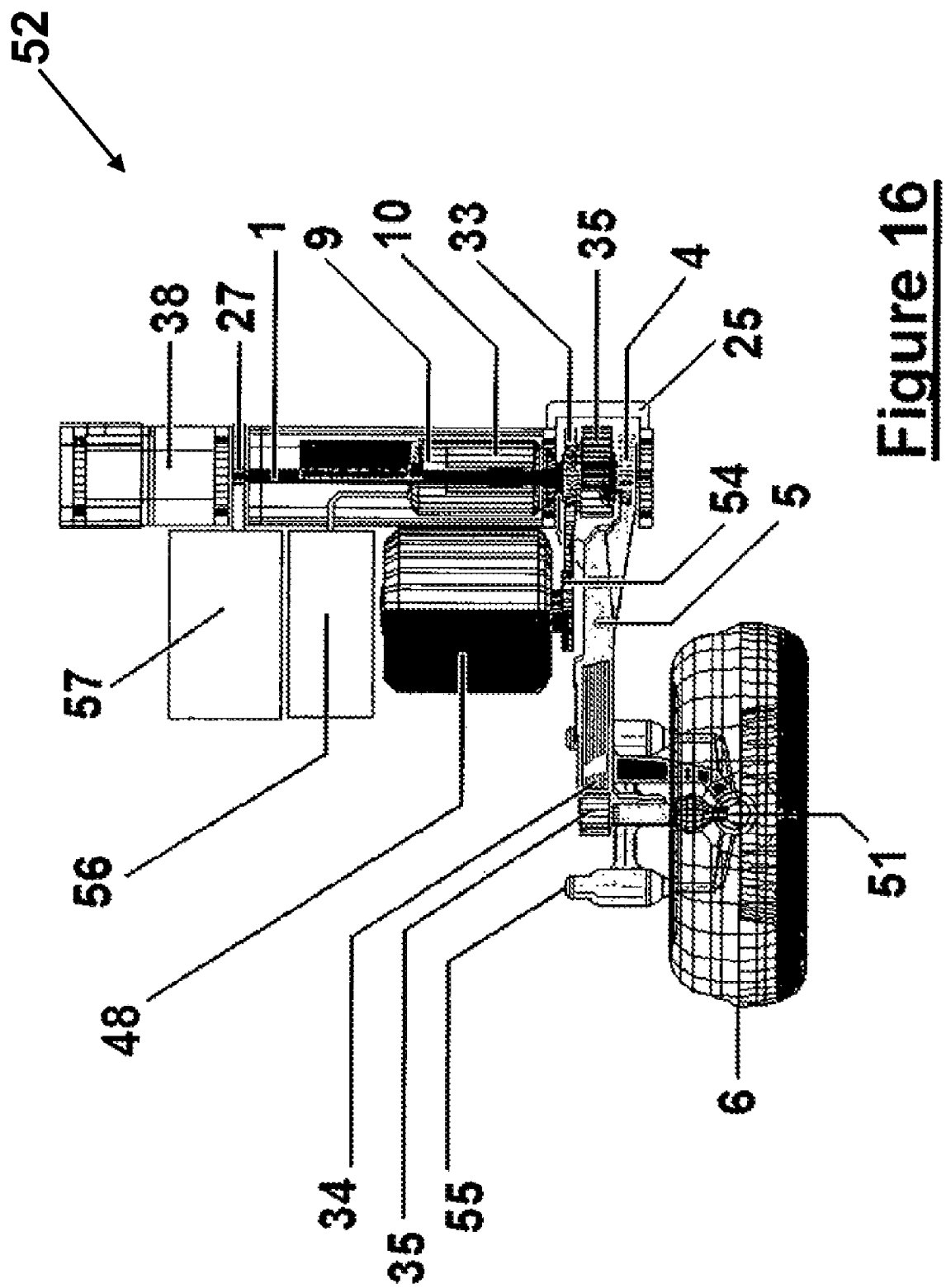
FIG. 16 a partially hidden plan view of an exemplary embodiment of one quarter of the frame according to the invention.
Figure 17:
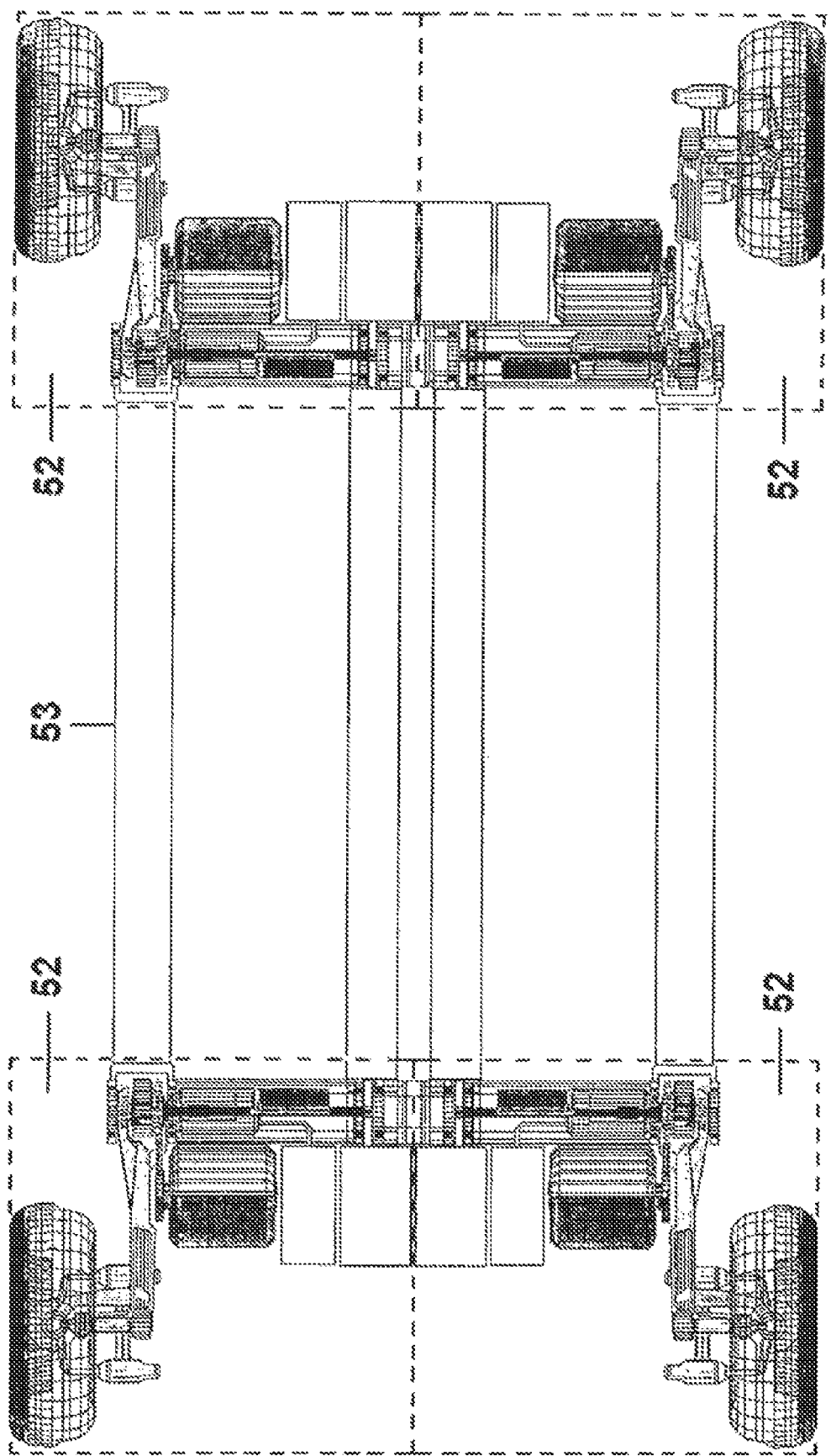
FIG. 17 is a partially hidden plan view of an exemplary embodiment of the system of the chassis according to the invention formed by the integration of four quarters.

The bar 1 constitutes a structural element of the suspension and the frame, which allows the power transmission/braking (see, e.g., FIG. 5), using a ring for the transmission of motion 33 as shown, for example, in FIGS. 5, 15, and 16. The location of the suspension arm is achieved with inner bearings 30, as shown for example in FIG. 4.

The arm 5 alternatively is located via bearings 29 externally onto the box-module of the suspension, which give kinematic features during the passive operation to the suspension. See, e.g., FIGS. 4, 5, and 11.

The arm 5 through the wheels 35 and a belt 34 transmits motion (power and braking) to the driven wheel 6 as shown, for example, in FIGS. 5, 13, 15, 16.

The chassis 47 and 53 (see, e.g., FIGS. 14 and 17) is formed by a repetitive insertion of four modules 17 in panels 20, that are connected through defining sections of the track 38 and the wheelbase 39 (see, e.g., FIG. 6). Using traditional transmission systems (namely without belt), the drive assembly passes through the section of the track 38.

Figure 8:
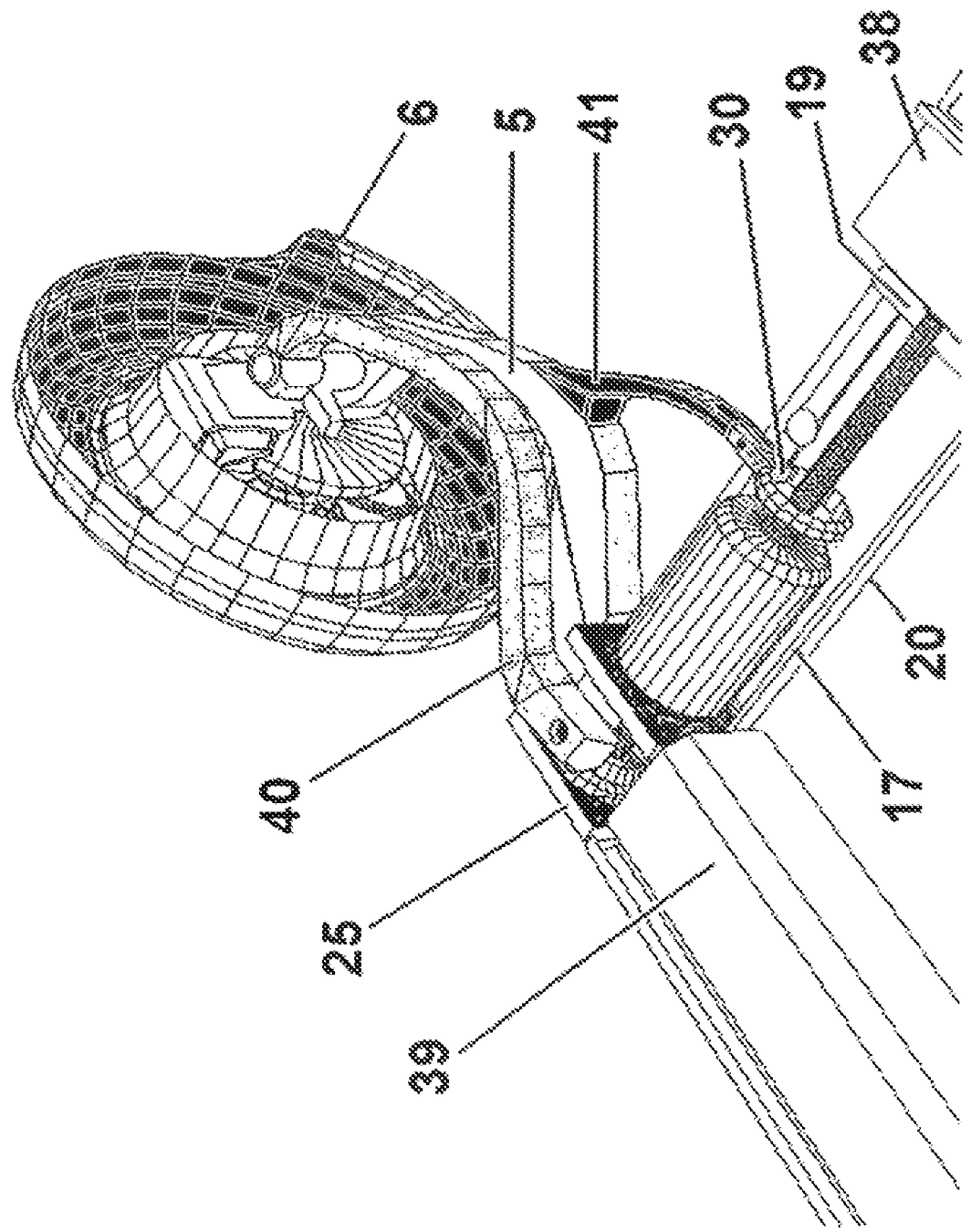
FIG. 8 a fragmentary, perspective view of a system according to another exemplary embodiment of the invention with an arm having an upper solid section and secondary inner section.

Alternatively, the wheel 6 is suspended on the panel 20 through hinged arms 42 and 43 (see, e.g., FIGS. 7 and 10), or through solid sections of an arm 5 with sections 40, 41 (see, e.g., FIG. 8). The form of the arms 5, 40, 41, 42, 43 depends on a kinematic/dynamic analysis of the loads that are generated during the motion.

The inventive system of the frame allows its connection with supplementary external-upper-sections of the body-shell 45 (front and rear) that are designed based primarily on their impact absorbtion disregarding other design compromises. These sections 45 constitute zones of controlled distortion as shown, for example, in FIG. 9.

What is claimed is:

1. A suspension-box-module for use with a longitudinal suspension arm having a steering assembly and locating and accommodating a wheel, a transmission wheel, the steering assembly, and a universal joint for the wheel, the suspension-box-module comprising:
    a suspension-box housing;
    a lateral torsion bar being a structural member of the suspension-box housing and having:
        a connection base having an end;
        an inner anchoring end having a shank;
        an external end operable to connect to the longitudinal suspension arm through the connection base; and
        a central part having a form and a cross-section varied as a function of its length;
    a co-axial damper unit housing a damper-fluid and having:
        seals sealing the damper-fluid;
        connectors; and
        wings having a base, the base and the connectors being connected to the torsion bar through the seals;
    an anchoring fixing the co-axial damper unit to the suspension-box-module;
    a co-axial transmission ring operable to connect to the longitudinal suspension arm and having a steering assembly;
    bearings for transmitting loads;
    a bracket shaped to support the suspension arm;
    a fastener operable to connect the suspension arm to the torsion bar at the end of the connection base;
    a connection connecting the torsion bar to the shank at the inner anchoring end;
    a belt; and
    a support bearing connecting the torsion bar to the co-axial transmission ring, the co-axial transmission ring operable to transmit power and braking to the wheel through the belt.

2. The suspension-box-module according to claim 1, wherein the wings of the co-axial damper unit are connected to the base and the connectors of the co-axial damper unit.

3. The suspension-box-module according to claim 1, wherein the torsion bar is operable to be secured to the suspension arm.

4. The suspension-box-module according to claim 1, further comprising a sliding mechanism operable to change a torsional stiffness of the torsion bar by sliding of an anchoring point of the torsion bar.

5. The suspension-box-module according to claim 1, further comprising external support bearings for supporting the suspension arm, the external support bearings having a contoured design.

6. The suspension-box-module according to claim 1, wherein the suspension-box housing is encased by box-panels of a parametric chassis and is located through support guides and securing sections at the box-panels.

7. The suspension-box-module according to claim 1, further comprising:
   a parametric chassis having box-panels encasing the suspension-box housing; and
   support guides and securing sections locating the suspension-box housing at the box-panels.

8. A parametric chassis system for vehicles having a rear suspension, the system comprising:
   a rear subframe for the rear suspension, the rear subframe having a track, a pair of trailing arms, and two prefabricated suspension-box-modules connected to the pair of trailing arms, the rear subframe being formed by a pair of two opposed box-panels encasing the two prefabricated suspension-box-modules, each suspension-box-module comprising a co-axial damper unit, a base, and a lateral torsion bar, each suspension-box-module enveloping the respective co-axial damper unit and locating a respective one of the two trailing arms through a respective base,
   a track panel forming a spacer connecting the two opposed suspension-box-modules, the track of the rear subframe being defined by a size of the track panel;
   a front subframe having two swivels, two pre-fabricated suspension-box-modules, and two leading arms, the front subframe corresponding to a reversed rear subframe and locating the two leading arms and wheels, the front subframe operable to carry out steering of the wheels through the two swivels;
   two longitudinal panels defining a wheel base of the vehicle and connecting the rear subframe to the front subframe; and
   a chassis having four corners, the four suspension-box-modules of the front subframe and the rear subframe being located on a respective one of the four corners of the chassis, the chassis in a fully active/adaptive mode being operable to apply asymmetric steering characteristics, being controlled electronically without mechanical connection, and providing vehicle control of ride-height, body-roll and dynamic handling by ensuring verticality of the wheels to a given degree.

9. The parametric chassis system according to claim 8, wherein each of the suspension-box-modules is a suspension-box-module comprising:
   a suspension-box housing;
   a lateral torsion bar being a structural member of the suspension-box housing and having:
      a connection base having an end;
      an inner anchoring end having a shank;
      an external end operable to connect to the longitudinal suspension arm through the connection base; and
      a central part having a form and a cross-section varied as a function of its length;
   a co-axial damper unit housing a damper-fluid and having:
      seals sealing the damper-fluid;
      connectors; and
      wings having a base, the base and the connectors being connected to the torsion bar through the seals;
   an anchoring fixing the co-axial damper unit to the suspension-box-module;
   a co-axial transmission ring operable to connect to the longitudinal suspension arm and having a steering assembly;
   bearings for transmitting loads;
   a bracket shaped to support the suspension arm;
   a fastener operable to connect the suspension arm to the torsion bar at the end of the connection base;
   a connection connecting the torsion bar to the shank at the inner anchoring end;
   a belt; and
   a support bearing connecting the torsion b. r to the co-axial transmission ring, the co-axial transmission ring operable to trans it power and braking to the wheel through the belt.

10. The parametric chassis system according to claim 9, wherein the chassis defines a storage bay and a slot, and further comprising panels at the storage bay, the storage bay and the panels shaped to store at least one of a battery and a fuel cell of the vehicle, the storage bay being accessible externally through the slot.

11. The parametric chassis system according to claim 10, wherein:
   each of the suspension-box-modules is anchored on one of the box-panels of the rear and front subframes at an inner anchoring point, and
   a bulge on the torsion bar of each suspension-box-module secures a position of the torsion bar relative to the corresponding one of the rear and front subframes.

12. The parametric chassis system according to claim 11, wherein:
   the trailing arms and the torsion bars of the suspension-box-modules of the rear subframe are located on the rear subframe with brackets; and
   the leading arms and the torsion bars of the suspension-box-modules of the front subframe are located on the front subframe with brackets.

13. The parametric chassis system according to claim 12, wherein the trailing and leading arms of the rear subframe and the front subframe are seated on bearings externally of the respective one of the suspension-box-modules.

14. The parametric chassis system according to claim 13, wherein each suspension-box-module is supported with support surfaces in one of the box-panels and is secured on the respective box-panel though a securing section.

15. A body-shell of a vehicle, comprising:
   the parametric chassis system according to claim 8; and
   external body-shell members, the body-shell formed by the chassis system and the body-shell members being supplementary self-carrying.

16. The body-shell according to claim 15, wherein the external body-shell members are formed by a tailoring technique using a design criterion for high impact-energy-absorption for the body-shell without the need of other design criteria having originated from the design of the chassis.

17. The body-shell according to claim 15, wherein each of the suspension-box-modules is a suspension-box-module comprising:
   a suspension-box housing;
   a lateral torsion bar being a structural member of the suspension-box housing and having:
      a connection base having an end;
      an inner anchoring end having a shank;
      an external end operable to connect to the longitudinal suspension arm through the connection base; and
      a central part having a form and a cross-section varied as a function of its length;
   a co-axial damper unit housing a damper-fluid and having:
      seals sealing the damper-fluid;
      connectors; and
      wings having a base, the base and t e connectors being connected to the torsion bar through the seals;
   an anchoring fixing the co-axial damper unit to the suspension-box-module;

a co-axial transmission ring operable to connect to the longitudinal suspension arm and having a steering assembly;

bearings for transmitting loads;

a bracket shaped to support the suspension arm;

a fastener operable to connect the suspension arm to the torsion bar at the end of the connection base;

a connection connecting the torsion bar to the shank at the inner anchoring end;

a belt; and a support bearing connecting the torsion bar to the co-axial transmission ring, the co-axial transmission ring operable to transmit power and braking to the wheel through the belt.

18. The body-shell according to claim 17, wherein:

each of the torsion bars has a bulge;

the chassis defines a storage bay and a slot, and, further comprising:

panels at the storage bay, the storage bay and the panels shaped to store at least one of a battery and a fuel cell of the vehicle, the storage bay being accessible externally through the slot;

each of the suspension-box-modules being anchored on one of the box-panels of the rear and front subframes at an inner anchoring point; and the bulge on the respective torsion bars of each suspension-box-module securing a position of the torsion bar relative to the corresponding one of the rear and front subframes.

19. The body-shell according to claim 18, wherein:

the trailing arms and the torsion bars of the suspension-box-modules of the rear subframe are located on the rear subframe with brackets;

the leading arms and the torsion bars of the suspension-box-modules of the front subframe are located on the front subframe with brackets; and the trailing and leading arms of the rear subframe and the front subframe are seated on bearings externally of the respective one of the suspension-box-modules.

20. The body-shell according to claim 19, wherein each suspension-box-module is supported with support surfaces in one of the box-panels and is secured on the respective box-panel though a securing section.

* * * * *